A. G. Stipher,
Harvester Dropper.
No. 24,591. Patented June 28, 1859.
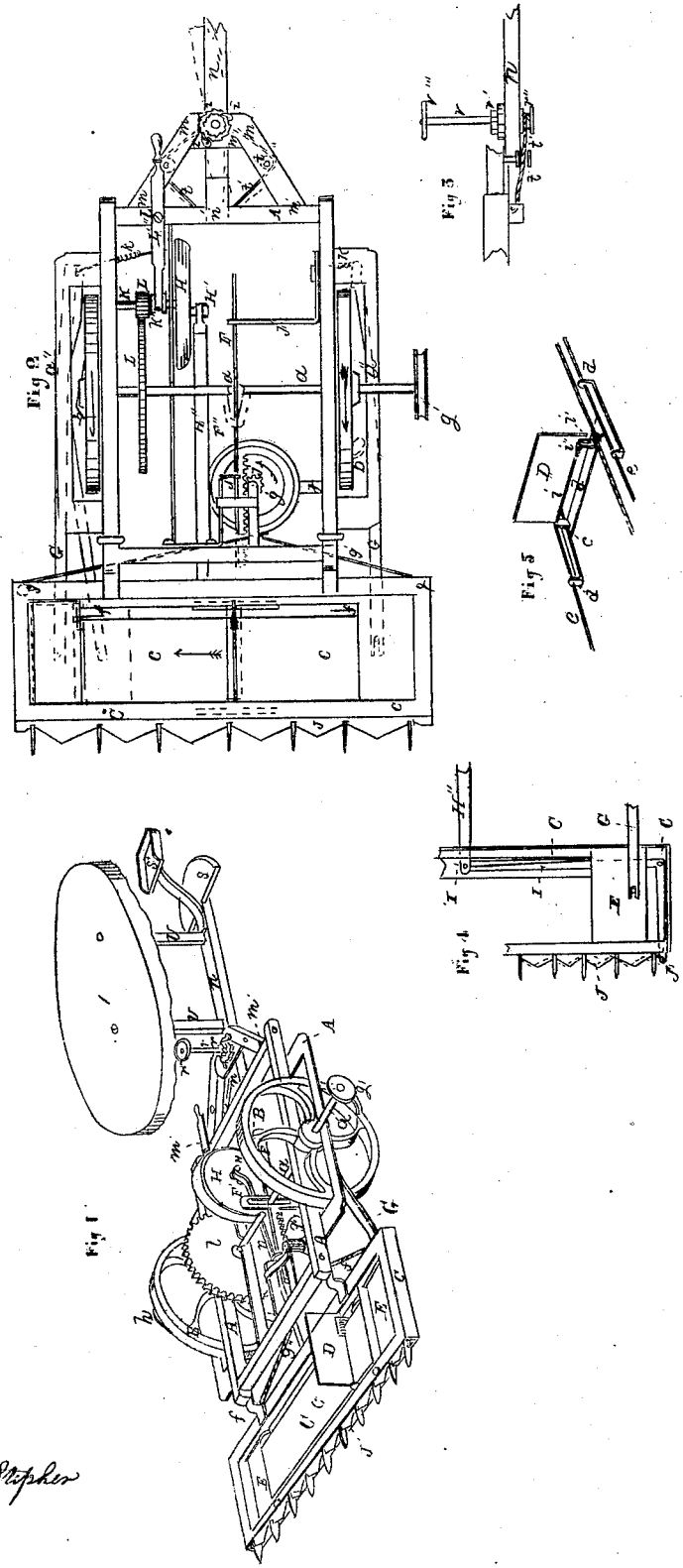

UNITED STATES PATENT OFFICE.

A. G. STIPHER, OF RICHMOND, INDIANA.

IMPROVEMENT IN HARVESTING-MACHINES.

Specification forming part of Letters Patent No. 24,591, dated June 28, 1859.

*To all whom it may concern:*

Be it known that I, A. G. STIPHER, of Richmond, in the county of Wayne and State of Indiana, have invented a new and useful Improvement in Harvesters; and I do hereby declare that the following is a full and clear description thereof, reference being had to the accompanying drawings, and to the letters of reference marked thereon, and made to form a part of this description.

The nature of my invention relates, first, to the construction, arrangement, and operation of a raking device; second, to a provision for depositing the bundles of grain from the platform; third, to a mode of operating the sickle; fourth, to a provision for guiding the harvester; fifth, to the arrangement of a canopy or shade for the operators and horses.

In reference to the accompanying drawings, Figure 1 is a perspective view of the harvester, showing all it working parts arranged for operation. Fig. 2 is a plan or top view of the harvester. Fig. 3 is a sectional view, showing the mode of operating the device for guiding the harvester. Fig. 4 is a sectional view, showing a portion of the device for operating the sickle. Fig. 5 is a sectional view, showing the arrangement of the raker.

A represents the frame to which the working parts of the harvester are attached.

B are the supporting and driving wheels, keyed firmly to the axle $a$, and provided with cams $b$.

C is the frame of the platform, upon which the sickle is arranged, and within which the platform $c$ and raker D are adjusted. Extending across the frame C, and made to work in grooves therein, is a sliding frame, $d$, fully shown in Fig. 5.

$e$ are guide-rods attached to the frame $c$ and made to pass through the flanges $d'$ of the frame $d$, shown clearly in Fig. 5. Through the posts $e'$, which are attached to the frame $d$ and project above the platform $c$, is made to pass a bent rod, $i\ i'$, to which the raker D is attached.

$i''$ is a spring, coiled around the rod $i$ and attached to the raker D, by means of which the raker is sustained in a vertical position, and at the same time allowed to tilt when subjected to too great a pressure.

$f$ are inclined planes, attached to the platform $c$, so arranged that when the raker D arrives at either end of the platform $c$ the bent portion $i'$ of the rod $i$ will catch against and ride upon said inclined planes, and thereby tilt the raker D, so as to deposit its gathered grain beyond the platform $c$ and upon the trap-doors E. Attached to the raker-frame $d$, and passing in either direction around pulleys $g$, arranged upon the frame $c$, (shown by dotted lines in Fig. 2,) to the oscillating pulley $g'$, is a cord, $g''$, through the medium of which the raker is made to operate.

F is a reciprocating bar, formed with a cross head, F', (shown in Fig. 1,) and provided with a rack, F''. (Clearly shown in Figs. 1 and 2.) Through the cross-head F' the crank $a'$ of the axle $a$ is made to pass, and by means of which the bar F is made to reciprocate as the wheels B rotate.

$j$ is a cog-wheel, attached to the pulley $g'$, into which the rack F'' of the bar F is made to work, and thereby impart oscillating or vibratory motion to said pulley.

$j'$ are supports attached to the frame A, which afford bearings for the journals of the pulley $g'$ and cog-wheels $j$.

$j''$ are guides for the bar F.

E are trap-doors, arranged to slide in grooves of the frame C, and are operated in such a manner as to deposit the bundles of gathered grain as received from the raker D upon the ground by means of levers G, which are pivoted to the frame A at $a''$, and bent in such manner as to be operated by cams $b$ of wheels B.

$k$ are spiral springs, arranged in such manner as to hold the upper ends of the bent levers G closely against the wheels B, thereby securing the closed position of the trap-doors E, except at the periods when the said levers are operated by means of cams $b$, as before described.

Attached to a pin, H', of the plate-wheel H is a rod, H'', extending therefrom to the frame C, where it is pivoted to a bent lever, I, at I', as shown clearly in Fig. 4. The lever I is pivoted to the frame C at C', (shown clearly in Fig. 4,) and attached to the sickle J at J', so that as the rod H'' is made to reciprocate longitudinally a corresponding lateral motion is imparted to the sickle J. The plate-wheel H is keyed to the shaft K.

Adjusted and made to turn loosely upon the shaft K is a cog-wheel, L, having upon its inner side a projection, and keyed to the shaft K is a collar, K', having on its outer side a projection corresponding to that upon the inner side of the wheel L.

L' is a lever, pivoted to the frame A at L'', and extending forward to a depression in the collar K', as clearly shown in Fig. 2, by means of which the said collar may be moved upon the shaft K in such manner as to throw said collar in and out of gear with the wheel L.

Keyed to the axle $a$ is a cog-wheel, $l$, adjusted to work into the wheel L, by means of which, when the collar K' is in gear with the wheel L, the plate-wheel H is made to rotate, thereby operating the rod H'', bent lever I I', and sickle J, as before described. Firmly attached to the frame A at $m'$, and extending backward and converging toward each other, are stay-pieces or timbers $m$, having permanently secured to their after ends a plate, $m''$. (Clearly shown in Fig. 2.)

Passing through the plate $m''$ and pole $n$ is a rod, $r$, provided with a ratchet-wheel, $r'$, collar $r''$, and hand-wheel $r'''$, the ratchet-wheel $r'$ being keyed to the rod $r$ above the plate $m''$, and the collar $r''$ being firmly secured to rod $r$ below the pole $n$. Said pole is thereby sustained in its proper position with reference to the plate $m''$ and stay-timbers $m$. The end $n'$ of the pole $n$ extends forward to the frame A, and is there inserted under and between said frame and a suitable bracket attached thereto in such manner as to allow to said end $n'$ lateral play.

Attached to the pole $n$ at $n''$, and passing around pulleys $t$ of the stay-timbers $m$ to the collar $r''$, is a cord $t'$, so that by turning the hand-wheel $r'''$ and winding the said cord $t'$ upon the collar $r''$ the end $n'$ of the pole $n$ may be moved laterally in the direction necessary for the proper guiding of the harvester, and any desired position thus secured may be sustained by means of the dogs $z$ taking into the ratchet-wheel $r'$.

S, Fig. 1, represents a bar, to which horses may be attached for moving the harvester.

S' is a seat for the driver. U are posts inserted into the pole $n$, upon which is arranged a canopy or covering V in such manner as to afford shade and covering for the horses and operators.

Having described the construction of my invention, its operation may be set forth as follows: The harvester being made to move forward, and the wheels C to rotate in the direction of the arrows, the collar K' being in gear with the wheel L, the rod H'' will be made to reciprocate, and thereby operate the sickle J, as before described, thereby cutting the grain or grass. A reel may be arranged upon the frame C, and made to operate by means of pulley-wheel $y$ of the axle $a$, to facilitate the drawing of the grain upon the platform $c$. As the grain falls upon the platform $c$, the raker D, being operated as before described, will gather it, convey it to the ends of the platform $c$, and deposit it upon the trap-doors E; and at that period of the operation of the harvester when the raker has arrived at either end of the platform $c$ and deposited its freight of grain upon the trap-doors E, the cams $b$ upon the side of the raker to which the raker has been moved will be in position to force the upper end of the bent levers G outward, thereby operating the trap-doors E in such manner as to slide them from under the grain, which is then permitted to fall, in proper bundles for binding, to the ground, upon either side of the harvester, as the case may be. The levers G, being released from the cams $b$, are returned by means of the spiral springs, thereby closing the trap-doors E, as before described. Proper direction may be given to the harvester by turning the hand-wheel $r'''$ of the rod $r$, thereby properly adjusting the pole $n$ to the direction required.

By means of the within-described harvester it is intended to cut a swath ten feet in width, which will afford sufficient grain for the making up of the proper-sized bundles at each lateral motion of the raker.

Having described the construction and operation of my invention, what I claim as new of my own invention, and desire to secure by Letters Patent, is—

1. The employment or use of the tilting spring-raker D, in combination with the sliding raker-frame $d$, constructed and arranged substantially as and for the purposes set forth.

2. Operating the raker-frame $d$ and raker D by means of the reciprocating bar F F', through the medium of the rack F'', cog-wheel $j$, pulley $g'$, and cord $g''$, all being arranged substantially as and for the purposes set forth.

3. In combination with the raker D, the sliding trap-doors E, operated by means of the bent levers G, springs $k$, and cams $b$, substantially as and for the purposes set forth.

In testimony of which invention I have hereunto set my hand this 7th day of May, A. D. 1859.

A. G. STIPHER.

Witnesses:
H. E. CLIFTON,
F. A. McDOWELL.